(No Model.) 3 Sheets—Sheet 1.

G. DESCAMPS.
FILTER.

No. 534,498. Patented Feb. 19, 1895.

WITNESSES:
C. Neveux
[signature]

INVENTOR
G. Descamps
BY Munn & Co
ATTORNEYS.

(No Model.) 3 Sheets—Sheet 2.
G. DESCAMPS.
FILTER.
No. 534,498. Patented Feb. 19, 1895.
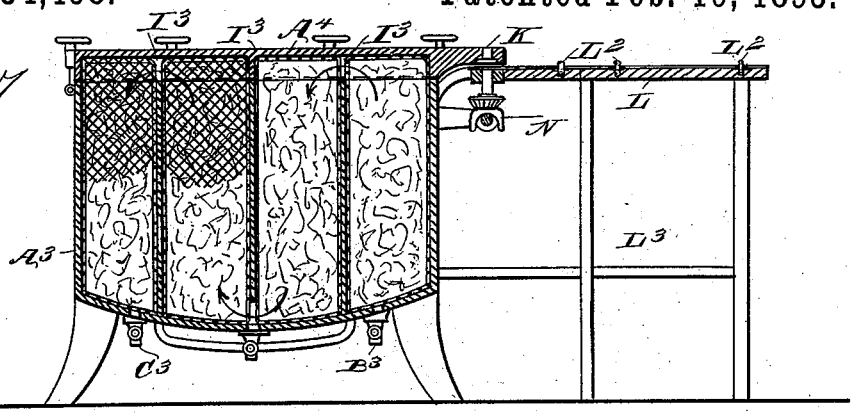
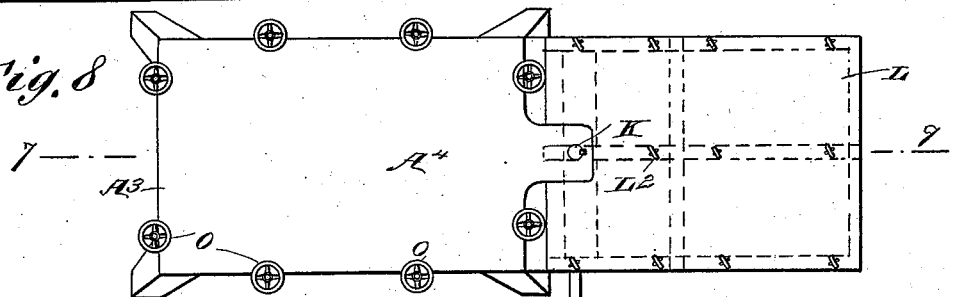
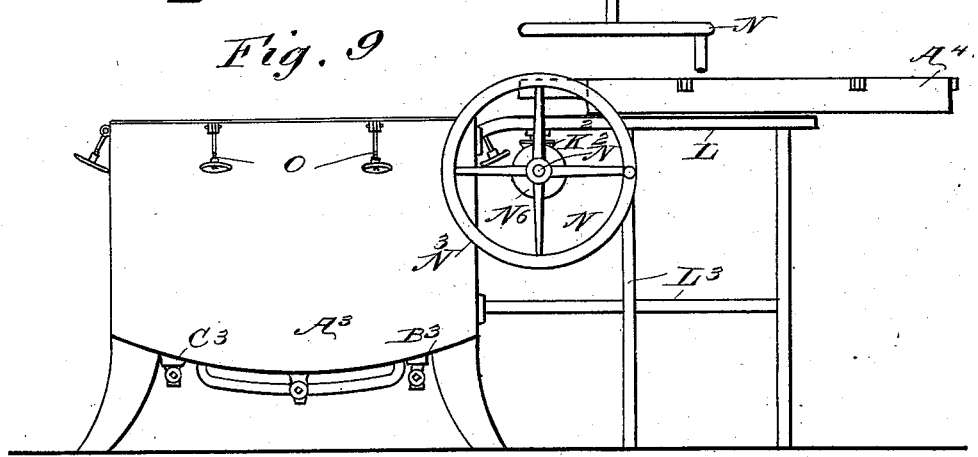
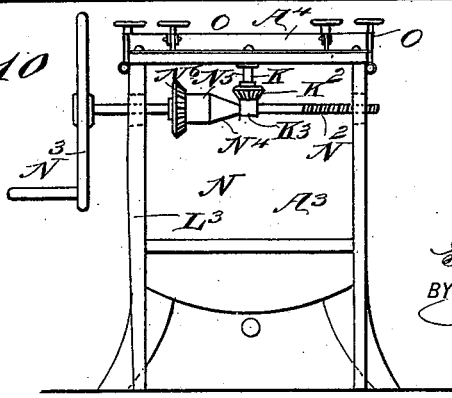
WITNESSES:
C. Neveux
Theo. G. Hoster
INVENTOR
G. Descamps
BY Munn & Co.
ATTORNEYS.

(No Model.) 3 Sheets—Sheet 3.
G. DESCAMPS.
FILTER.
No. 534,498. Patented Feb. 19, 1895.
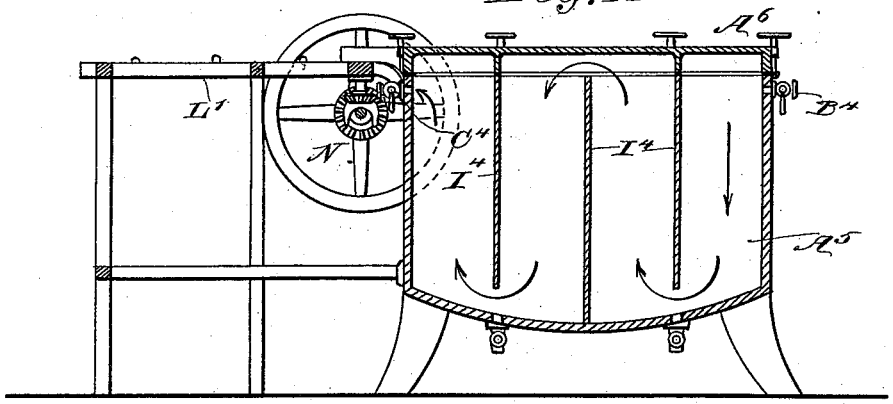
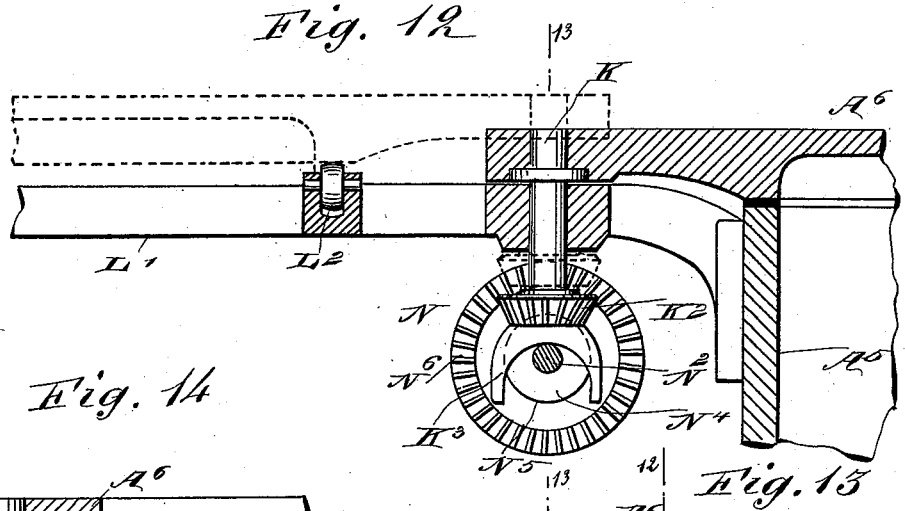
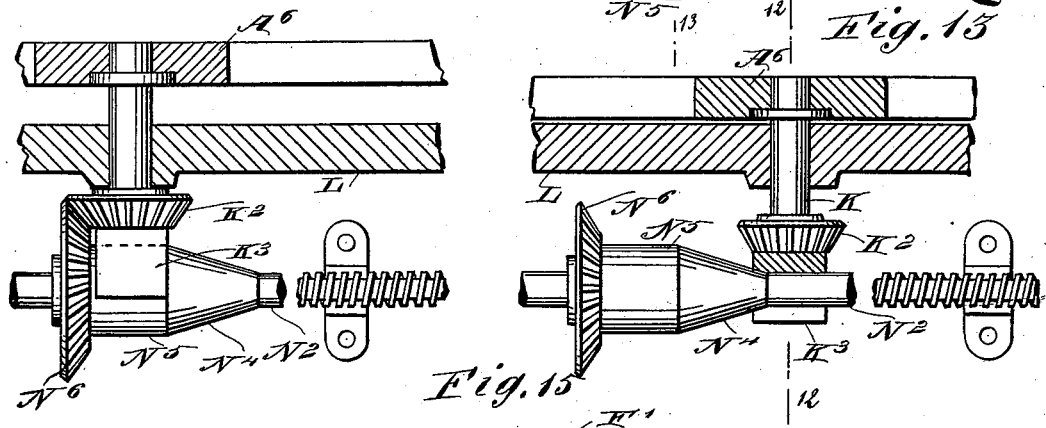
WITNESSES:
C. Neveux
Theo. G. Hoskins
INVENTOR
G. Descamps
BY
Munn & Co.
ATTORNEYS.
THE NORRIS PETERS CO., PHOTO-LITHO., WASHINGTON, D. C.

UNITED STATES PATENT OFFICE.

GASTON DESCAMPS, OF HAVANA, CUBA.

FILTER.

SPECIFICATION forming part of Letters Patent No. 534,498, dated February 19, 1895.

Application filed July 2, 1894. Serial No. 516,283. (No model.)

*To all whom it may concern:*

Be it known that I, GASTON DESCAMPS, of Havana, Cuba, have invented a new and Improved Filter, of which the following is a full, clear, and exact description.

The object of the invention is to provide a new and improved filter, which is simple and durable in construction, very effective in operation, and arranged to filter a large quantity of liquid in a comparatively short time.

The invention consists of a tank or vessel, and a basket or net suspended in the said tank or vessel and containing the filtering material in the shape of sponge, &c.

The invention also consists of certain parts and details, and combinations of the same, as will be hereinafter fully described and then pointed out in the claims.

Reference is to be had to the accompanying drawings, forming a part of this specification, in which similar letters of reference indicate corresponding parts in all the views.

Figure 1:
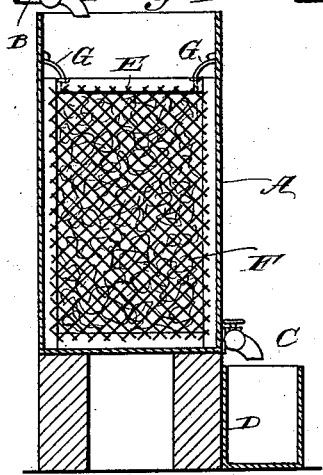
Figure 3:
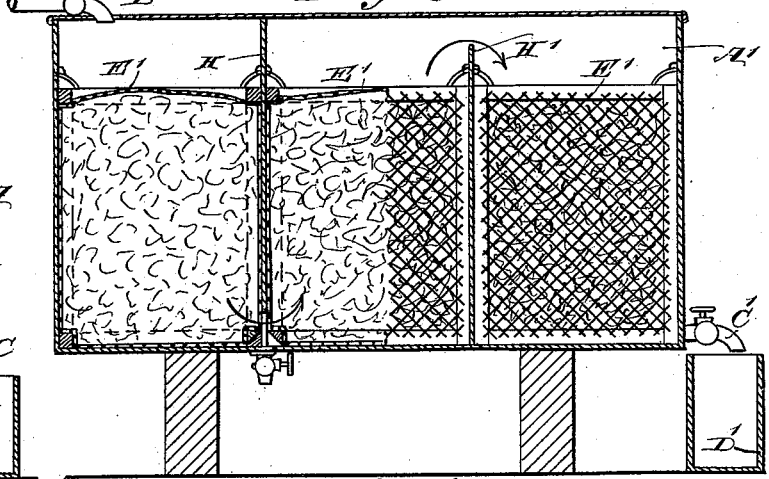
Figure 2:
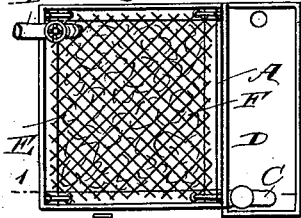
Figure 4:
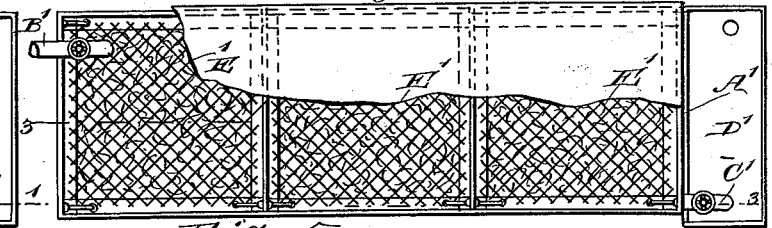
Figure 5:
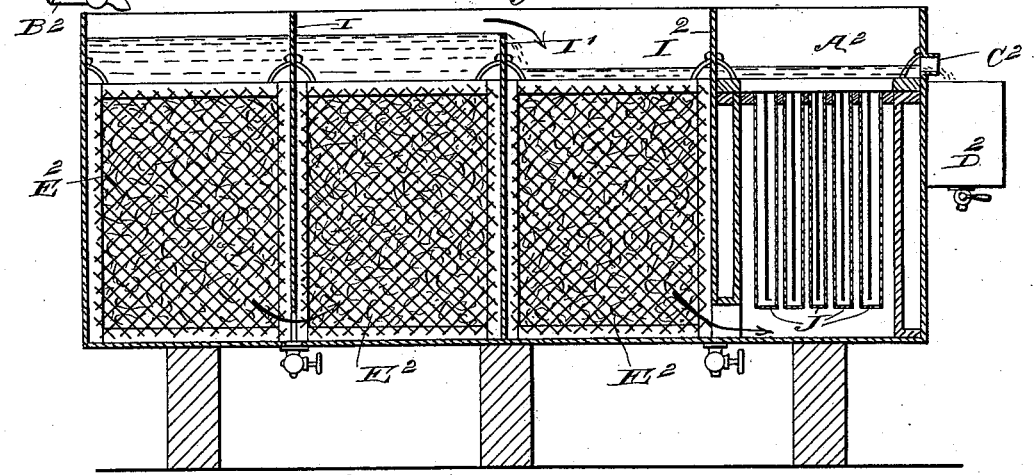
Figure 6:
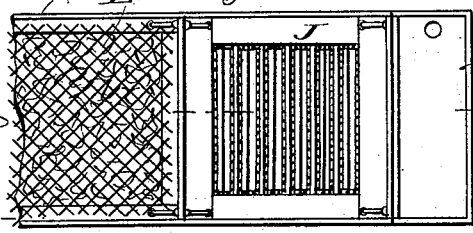

Figure 1 is a sectional side elevation of the improvement, on the line 1—1 of Fig. 2. Fig. 2 is a plan view of the same. Fig. 3 is a sectional side elevation of a modified form of the improvement, on the line 3—3 of Fig. 4. Fig. 4 is a plan view of the same. Fig. 5 is a sectional side elevation of another modified form of the improvement, on the line 5—5 of Fig. 6. Fig. 6 is a plan view of part of the same. Fig. 7 is a sectional side elevation of another modified form of the improvement, on the line 7—7 of Fig. 8. Fig. 8 is a plan view of the same. Fig. 9 is a side elevation of the same. Fig. 10 is an end elevation of the same. Fig. 11 is a rear sectional side elevation of the same. Fig. 12 is an enlarged sectional side elevation of the mechanism for moving the cover, the section being taken on the line 12—12 of Fig. 13. Fig. 13 is a transverse section of the same, on the line 13—13 of Fig. 12. Fig. 14 is a similar view of the same with the parts in a different position;
and Fig. 15 is a plan view of a string of sponges.

The filter as illustrated in Figs. 1 and 2, is provided with a suitably constructed tank A, into which discharges a supply pipe B, and from which leads an outlet pipe C, adapted to discharge the filtered liquid into a receptacle D.

Within the tank A is suspended a basket or net E, containing a filtering material F, preferably in the shape of sponges F', held on a string $F^2$, as plainly illustrated in Fig. 15, the said string of sponges being loosely placed in the said basket or net, and the liquid from the supply pipe B is discharged upon the said sponges. The basket or net E is suspended within the tank A by suitable hangers G, as shown in the said Figs. 1 and 2. Now it will be seen that the liquid discharged from the pipe B upon the filtering material F, percolates through the latter, to be freed from its impurities, the filtered liquid being finally discharged through the outlet pipe C.

As illustrated in Figs. 3 and 4, the tank A' is provided with an inlet pipe B', with a discharge pipe C', delivering into a receptacle D', and with transverse partitions H, H', so as to form several compartments within the tank A', each compartment containing a separate basket or net E' suspended therein in a similar manner to the basket E in the tank A. The partition H extends from the top or cover of the tank A' to within a short distance of the bottom thereof, and the other partition H' extends from the bottom to within a short distance of the cover of the tank, as will be readily understood by reference to Fig. 3.

The inlet or supply pipe B' discharges upon the sponges in the first compartment, the partly filtered liquid passing into the second compartment at the bottom of the partition H, to rise in the filtering material in the second compartment, and then pass over the partition H' into the last filtering compartment at the top of the sponges therein, to be finally discharged at the bottom of this last compartment through the pipe C' into the vessel D'.

As illustrated in Figs. 5 and 6, the tank $A^2$ is open at the top and is provided with transverse partitions I, I', $I^2$, arranged in such a manner that the liquid discharged into the first compartment by the pipe $B^2$, passes under the first partition I, into the second compartment, and then over the upper end of the partition I' into the third compartment and under the bottom of the partition $I^2$ into the last compartment, to move through a series of filtering bags J suspended within the said compartment. The liquid then flows from this last compartment at the top of the bags J through a pipe $C^2$ into the vessel $D^2$. It is understood that in each of the said compartments formed by the partitions I' and I², are arranged baskets or nets E², containing a filtering material in the shape of sponges.

As illustrated in Fig. 7, the tank A³ is provided with transverse partitions I³, forming compartments for circulating the liquid through the filtering material contained in the different compartments. The supply pipe B³ enters the bottom of the first compartment, and the discharge pipe C³ is in the bottom of the last compartment, it being understood that the partitions are arranged in such a manner as to extend alternately within a short distance of the top and bottom, to permit the liquid to be filtered to circulate through the different compartments, as indicated by the arrows in Fig. 7. The cover A⁴ for this tank A³ is provided at one end with an extension secured on a vertically disposed shaft K mounted to turn and to slide vertically so as to enable the operator to conveniently remove the cover and rest the same on a table L while removing the filtering material for cleaning or other purposes, or otherwise repairing and examining the contents of the tank A³ as the case may be.

As shown in Fig. 11, the tank A⁵ has partitions I⁴, forming compartments alternately connected with each other at the top and bottom by the said partitions, as shown. The inlet supply pipe E⁴ enters the outermost compartment at one side of the tank, and the outlet C⁴ is arranged on the opposite side near the top. The flow of the liquid through the tank and filtering material contained therein is indicated by the arrows.

In order to manipulate the covers A⁴ and A⁶ for the tanks A³ and A⁵, I provide a raising and turning device N for the cover, the said device being illustrated in detail in Figs. 12, 13 and 14.

On the lower end of the shaft K is secured a gear wheel K², and a saddle K³ adapted to straddle a screw rod N² mounted to screw transversely in suitable nuts arranged in the support L³ of the table L. The saddle K³ is adapted to travel on a cone N⁴ upon the cylinder N⁵, secured with the said cone on the screw rod N², so that an upward sliding motion is imparted to the said shaft K, to lift the cover A⁴ or A⁶ bodily off the top of the tank A³ or A⁵. On the end of the cylinder N⁵ is secured or arranged a bevel gear wheel N⁶, adapted to mesh into the pinion N², so that on the turning of the hand wheel N³ held on the rod N², a rotary movement is given to the shaft K, whereby the cover A⁴ or A⁶ is turned and swung from the tank A³ or A⁵ upon the table L.

In order to reduce the friction as much as possible I provide the top of the table L with friction rollers L² arranged obliquely and journaled in the top of the table, as will be readily understood by reference to Figs. 7, 8 and 12. Thus for very heavy tanks the cover for the same can be conveniently removed whenever necessary.

The covers of the tanks are securely locked in place by suitable fastening devices O, of any approved construction.

Having thus described my invention, I claim as new and desire to secure by Letters Patent—

1. The combination with the cover and its vertical shaft having a gear on its lower end and a saddle or yoke, of a transverse shaft mounted to slide through and turn in the yoke and provided with a cone to engage the yoke and raise the vertical shaft and its cover and a gear at the base end of the cone to engage the gear on the vertical shaft, substantially as described.

2. The combination with the cover and its vertical shaft provided with a gear and a saddle or yoke at its lower end, of a transverse screw shaft mounted to slide through and turn in the yoke and having a cone N⁴, a cylinder N⁵ and a gear N⁶, substantially as described.

3. A filter provided with a filtering tank having a cover, means, substantially as described, for raising and swinging the cover, and a table adjacent to the tank, for supporting the cover when swung away from the tank, substantially as described.

4. A filter provided with a raising and swinging mechanism for the cover of the filtering tank, comprising a shaft mounted to slide vertically and to turn and carrying the cover, a bevel gear wheel on the said shaft, a saddle held on the shaft, a screw rod formed with a cone and cylinder adapted to be engaged by the said saddle, and a bevel gear wheel turning with the said screw rod and adapted to engage the said bevel gear wheel on the shaft, substantially as shown and described.

GASTON DESCAMPS.

Witnesses:
JOSEPH A. SPRINGER,
ERNESTO L. TOSCAR.